(12) United States Patent  (10) Patent No.: US 6,546,207 B2
Wakui  (45) Date of Patent: Apr. 8, 2003

(54) CAMERA CAPABLE OF INPUTTING DATA AND SELECTIVELY DISPLAYING IMAGE

(75) Inventor: Yoshio Wakui, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/776,899

(22) Filed: Feb. 6, 2001

(65) Prior Publication Data

US 2001/0012450 A1 Aug. 9, 2001

(30) Foreign Application Priority Data

Feb. 7, 2000 (JP) ...................................... 2000-029240

(51) Int. Cl.⁷ ............................................. G03B 17/00
(52) U.S. Cl. .................................. 396/298; 348/333.01
(58) Field of Search ............................... 396/297, 298, 396/529, 543, 532; 348/333.01, 345, 356

(56) References Cited

U.S. PATENT DOCUMENTS

| 4,598,986 A | * | 7/1986 | Shiratori et al. ............ 396/208 |
| 5,241,334 A | * | 8/1993 | Kobayashi et al. ......... 396/264 |
| 5,557,365 A | * | 9/1996 | Ohsawa ...................... 396/279 |
| 5,666,186 A | * | 9/1997 | Meyerhoefer et al. ...... 396/281 |
| 5,815,748 A | * | 9/1998 | Hamamura et al. ......... 396/104 |
| 5,897,228 A | * | 4/1999 | Schrock ...................... 396/297 |

* cited by examiner

*Primary Examiner*—Russell Adams
*Assistant Examiner*—D. Ben Esplin
(74) *Attorney, Agent, or Firm*—Greenblum & Bernstein, P.L.C.

(57) ABSTRACT

A camera, including a body, a lens barrel has a rotating ring, a rotational position detector, a character memory and a character information recorder. The rotating ring is rotatably provided on an outer circumference of the lens barrel. The rotational position detector detects a rotational position of the rotating ring. Character information, associated with the object image and defined on the basis of the plurality of characters, is set by an operator. The character information recorder selectively reads characters, corresponding to the character information, from the plurality of characters stored in said character memory, and records the character information in the recording medium as additional data. Then, the rotating ring operates as a device for setting the character information. The character information to be recorded in a recording medium is set in accordance with the rotational position of the rotating ring.

34 Claims, 14 Drawing Sheets

CAMERA CAPABLE OF INPUTTING DATA AND SELECTIVELY DISPLAYING IMAGE

BACKGROUND OF THE INVENTION

1. Field of the Invention

The present invention relates to a camera capable of inputting data associated with a photographed image and/or selectively displaying an image, from a series of recorded images, on a screen.

2. Description of the Related Art

It is known in the art that with a digital still camera or APS (Advanced Photo System) camera, data, i.e., character information which adds written comments to photographed images, can be recorded in a recording medium such as a memory card, or a photographic film for APS, with the photographed image. To record such character information, an device for inputting data, such as push button or cross key, is provided on the outer surface of camera, the user operates the buttons or keys to select one character from a series of preset characters or one comment from a set of preset comments, to input and record the character information.

Further, in the case of the digital still camera, a recorded image can be selectively displayed on a display, e.g. an LCD (Liquid Crystal Display) provided at the back of the camera. At this time, one recorded image is selected from a plurality of images by operating the push buttons or the keys.

However, when the operator selects one from many characters, comments or images using the push buttons or the keys, the operator has to press repeatedly to select the character, comment or the image. This process is cumbersome and time consuming for the operator.

SUMMARY OF THE INVENTION

Therefore, an object of the present invention is to provide a camera that facilitates the operation of inputting data and/or the selecting an image displayed on the screen.

A camera of the present invention has a body and a lens barrel with a photographing optical system. The photographing optical system forms an object image and the object image is recorded to a recording medium detachably installed in the body. The camera has a rotating ring, a rotational position detector, a character memory, a character information recorder and a mode selector. The rotating ring is rotatably provided on an outer circumference of the lens barrel. The rotational position detector detects a rotational position of the rotating ring. In the character memory, a plurality of characters is stored as data. Character information is associated with the object image and defined on the bas is of the plurality of characters. Then, the character information is set by an operator. The character information recorder selectively reads characters, corresponding to the character information, from the plurality of characters stored in the character memory, and records the character information in the recording medium as additional data. The mode selector is provided for selecting one mode from at least a photographing mode for recording the object image and a data-input mode for setting and recording the character information. Then, in the present invention, the rotating ring operates as a device for setting a photographing condition when the photographing mode is selected, and the rotating ring operates as a device for setting the character information when the data-input mode is selected. When the photographing mode is selected, the photographing condition is changed in accordance with the position of the rotating ring. On the other hand, when the data-input mode is selected, the character information to be recorded in the recording medium is set in accordance with the position of the rotating ring.

According to another aspect of the present invention, a camera of the present invention has a body and a lens barrel with a photographing optical system. The photographing optical system forms an object image and the object image is recorded to a recording medium detachably installed in the body. The camera has a rotating ring, a rotational position detector, a character memory and a character information recorder. The rotating ring is rotatably provided on an outer circumference of the lens barrel. The rotational position detector detects a rotational position of the rotating ring. In the character memory, a plurality of characters is stored as data. Character information, associated with the object image and defined on the basis of the plurality of characters, is set by an operator. The character information recorder selectively reads characters, corresponding to the character information, from the plurality of characters stored in the character memory, and records the character information in the recording medium as additional data. Then, the rotating ring operates as a device for setting the character information. The character information to be recorded in the recording medium is set in accordance with the rotational position of the rotating ring.

According to another aspect of the present invention, a camera has a body and a lens barrel with a photographing optical system. A plurality of object images is recorded in a recording medium detachably installed in the body. The camera has a rotating ring, a display and a rotational position detector. The recording medium is provided for storing a plurality of object images as data. The display selectively displays an object image from the plurality of object images recorded in the recording medium. The rotating ring is rotatably provided on an outer circumference of the lens barrel. The rotational position detector detects the position of the rotating ring. The rotating ring operates as a device for selecting an object image from the plurality of object images. Namely, an object image to be displayed on the display is selected from the plurality of object images in accordance with the rotational position of the rotating ring.

BRIEF DESCRIPTION OF THE DRAWINGS

The present invention will be better understood from the description of the preferred embodiment of the invention set fourth below together with the accompanying drawings, in which.

DESCRIPTION OF THE PREFERRED EMBODIMENTS

Hereinafter, the preferred embodiment of the present invention is described with reference to the attached drawings.

FIGS. 1 to 7 show a digital still camera of a first embodiment of the present invention.

Figure 1:
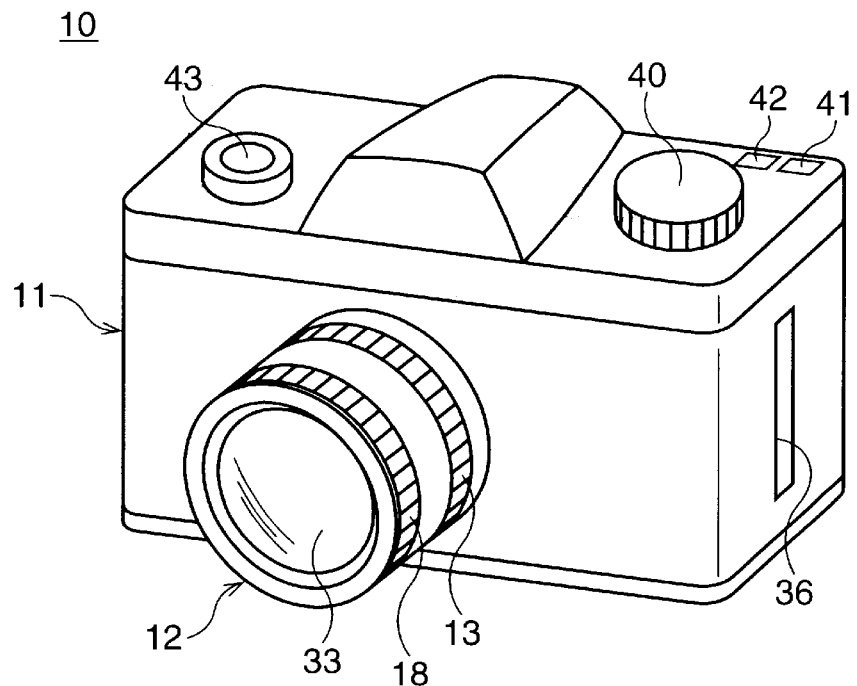
FIG. 1 is a perspective view of a digital still camera of a first embodiment, as seen from the front.
Figure 2:
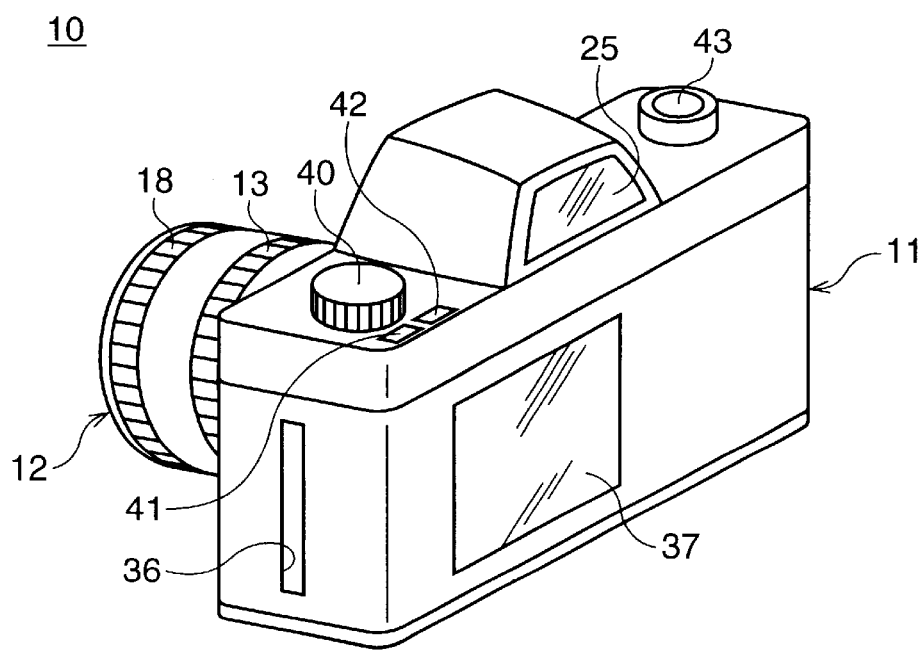
FIG. 2 is a perspective view of the digital still camera seen from the rear.
Figure 3:
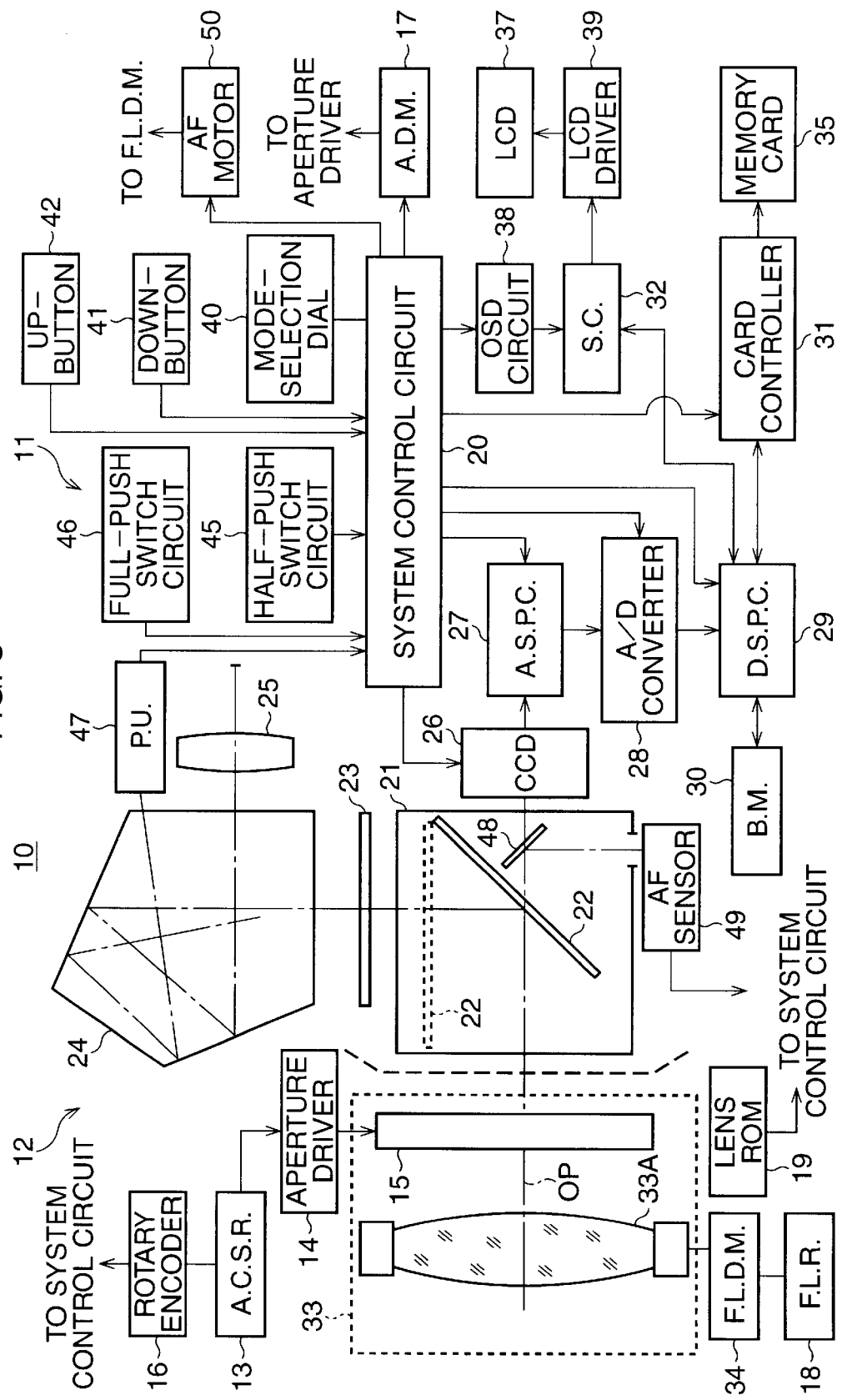
FIG. 3 is a block diagram of the digital still camera of the first embodiment.

FIGS. 1 and 2 are a perspective view of the digital still camera and FIG. 3 is a block diagram of the same.

The digital camera 10 is a SLR (Single Lens Reflex) type camera and has a camera body 11 and lens barrel 12, the lens barrel 12 mounted to the front surface of the body 11. The lens barrel 12 is inter changeably mounted to the body 11 and accommodates a photographing optical system 33, which includes an iris aperture (diaphragm) 15 and photographing lenses 33A, as shown in FIG. 3. A group of focus lenses is included in the photographing lenses 33A.

An aperture and character setting ring 13 is rotatably provided on an outer surface, namely, outer circumference of the lens barrel 12, as shown in FIG. 1. When preparing to photograph, the aperture and character setting ring 13 operates as an aperture ring, which allows the operator to set an aperture value of the iris aperture 15. The aperture value varies with a rotational position of the ring 13. The iris aperture 15 is driven toward open and closed by an aperture driver 14 (See FIG. 3) in accordance with the rotation of the aperture and character setting ring 13.

Further, as described later, when inputting character information, the aperture and character setting ring 13 operates as a ring for setting the character information. The aperture and character setting ring 13 has a base point along a periphery of the ring 13, and the rotation direction and the rotational position of the aperture and character setting ring 13 are detected by a rotary encoder 16 (See FIG. 3), relative to the position of the base point. Herein, the rotary encoder 16 is a photo-type or magnetic-type rotary encoder.

Note that, when the aperture and character setting ring 13 is positioned at an automatic position for automatically setting the opening degree of the iris aperture 15, the aperture value is automatically determined and the iris aperture 15 is automatically driven in accordance with the determined aperture value. In this case, the iris aperture 15 is opened and closed by an aperture drive mechanism 17 provided in the body 11.

The group of focus lenses incorporated in the photographing lenses 33A is capable of shifting along an optical axis OP. In addition to the aperture and character setting ring 13, a focus lens ring 18 for manual focusing is provided on the outer surface of the lens barrel 12. When the focus lens ring 18 is rotated, the group of focus lenses is shifted along the optical axis OP by a focus lens drive mechanism 34 in accordance with the rotation of the focus lens ring 18, so that the focus is adjusted. Note that, a rotary encoder for the focus lens ring 18 is also provided (not shown).

When the lens barrel 12 is attached to the body 11, the lens barrel 12 is electrically connected to the body 11, so that optical system information stored at a lens ROM 19 in the lens barrel 12, e.g., an aperture value or "f-number" when fully-opened, is fed to a system control circuit 20 in the body 11. The optical system information is utilized during an exposure control performed by the system control circuit 20. The system control circuit 20 controls the entire digital still camera 10. Further, a pulse signal, representing the position of the iris aperture 15, is fed from the rotary encoder 16 to the system control circuit 20 via the electrically connection.

A quick return mirror 22, provided in a mirror box 21 formed at the rear of the lens barrel 12, pivots between an inclined-position (down position) shown by solid line in FIG. 3 and an up-position shown by single chained-line. The quick return mirror 22 is driven by a mirror drive mechanism (not shown). The quick return mirror 22 is usually placed at the down position, whereby light, passing through the photographing optical system 33 along the optical axis OP, is directed toward a focus plate (focus glass) 23, disposed above the quick return mirror 22, by the quick return mirror 22. The object image is formed on the focus plate 23 so that the object image to be photographed is observed through a pentagonal roof prism 24 and a view finder 25 by the operator.

When the photographing is performed, the quick return mirror 22 is rotated to the up-position, and the light from the photographing optical system is received by a CCD 26 placed at the rear of the mirror box 21. Consequently, image-pixel signals corresponding to the object image formed on the CCD 26 are generated and fed to an analog signal process circuit 27, in which the amplification process and so on is performed. The processed pixel-image signals are converted to digital image signals at an A/D converter 28 and fed to a digital signal process circuit 29. In the digital signal process circuit 29, various processes, such as the white balance process, etc., are performed to the digital image signals and the digital image signals are transformed to digital image data that can be utilized in a personal computer. The digital image data is fed to a buffer memory 30, which temporarily stores the image data, and a superimposing circuit 32 for superimposing character information onto the object image.

A card slot 36 (See FIGS. 1 and 2) for installing a memory card 35, such as a flash memory, is formed on the side of the body 11 and an LCD (Liquid Crystal Display) 37 for displaying the object image is provided on the rear surface of the body 11. The memory card 35 is one of a card-type memory device, detachably installed in a digital camera body and computer. Object image data and character data is written to and read from the memory card 35 via a card controller 31.

An OSD (On Screen Display) circuit 38 with a character generator ROM is connected to the superimposing circuit 32. In the character generator ROM, character codes are stored as data and each character code is addressed in the character generator ROM. In this embodiment, the character codes correspond to capital letters of the English alphabet. The OSD circuit 38 is controlled by the system control circuit 20, the character codes are read from the OSD circuit 38 in accordance with the rotational position of the aperture and character setting ring 13 and are then fed to the superimposing circuit 32 as character data. The character data are superimposed into the digital image data so that the object image and the character information are displayed together on the LCD 37 via a LCD driver 39.

On the upper surface of the body 11, as shown in FIG. 1, a mode-selection dial 40, an up-button 42, a down-button 41 and a release button 43 are provided. The mode-selection dial 40 selectively exchanges between a photographing mode, for recording the object image data in the memory card 35, an image reproduction mode, for selectively displaying a recorded object image on the LCD 37, and a exposure-setting mode for setting the exposure period manually, in accordance with a rotational position of the aperture and character setting ring 13. Further, in this embodiment, a data-input process mode for performing a data-input process is prepared. The data-input process for inputting data is performed while the image reproduction mode is selected, as described later. When the mode is set to the exposure-setting mode, the exposure period, i.e., the shutter speed, is manually selected by pushing the up-button 42 or the down-button 41. Note that, both the shutter speed and aperture value may be automatically or manually selected.

When the photographing mode is selected and the release button 43 is halfway depressed, the half-push switch circuit 45 is turned ON, whereby the amount of light reflected from the object is measured by a photometry unit 47. When the automatic exposure is performed, the shutter speed and the exposure value are calculated at the system control circuit 20. When the exposure-setting mode is selected and the shutter speed is manually determined, the aperture value is set at the system control circuit 20. Note that, when the aperture value and the shutter speed are manually selected, an over or under exposure is indicated on the LCD 37, on the basis of the amount of light.

Further, the digital still camera 10 has an AF (auto-focus) function. When the quick return mirror 22 is in the down-position, a portion of light from the photographing optical system 33 passes through the quick return mirror 22 and is reflected from a sub mirror 48, attached to the quick return mirror 22, to an AF sensor 49. The AF sensor 49, disposed below the mirror box 21, detects whether the object image is focused. When the release button 43 is depressed halfway, a defocused amount is detected by the AF sensor 49 and the system control circuit 20 controls an AF motor 50 to focus the object image. The focus lens drive mechanism 34 is driven by the AF motor 50 so that the group of focus lenses is shifted along the optical axis OP. Note that, the focusing may be performed by the manual operation of the focus lens ring 18. In this case, the operator confirms the focus position via the viewfinder 25 or the LCD 37.

When the release button 43 is fully depressed, a full-push switch circuit 46 is turned ON, the quick return mirror 22 pivots to the up-position with the sub mirror 48, and the CCD 26 is exposed for a predetermined exposure time. This time corresponds to the shutter speed. In this embodiment, an "electronic-shutter", well known in the prior art, is applied in place of a mechanical focal plane shutter. Note that, a mechanical focal plane shutter may be provided between the mirror box 21 and the CCD 26 to sufficiently shield light from the photographing optical system after the exposure.

The image-pixel signals generated at the CCD 26 are transformed to digital image data via the analog signal process circuit 27, the A/D converter 28 and the digital signal process circuit 29, as described above. The digital image data is temporarily stored in the buffer memory 30 and is subjected to a given process and compressed in the digital signal process circuit 29, so that the digital image data is compatible with the personal computer, and then recorded in the memory card 35 as described above.

Figure 4:
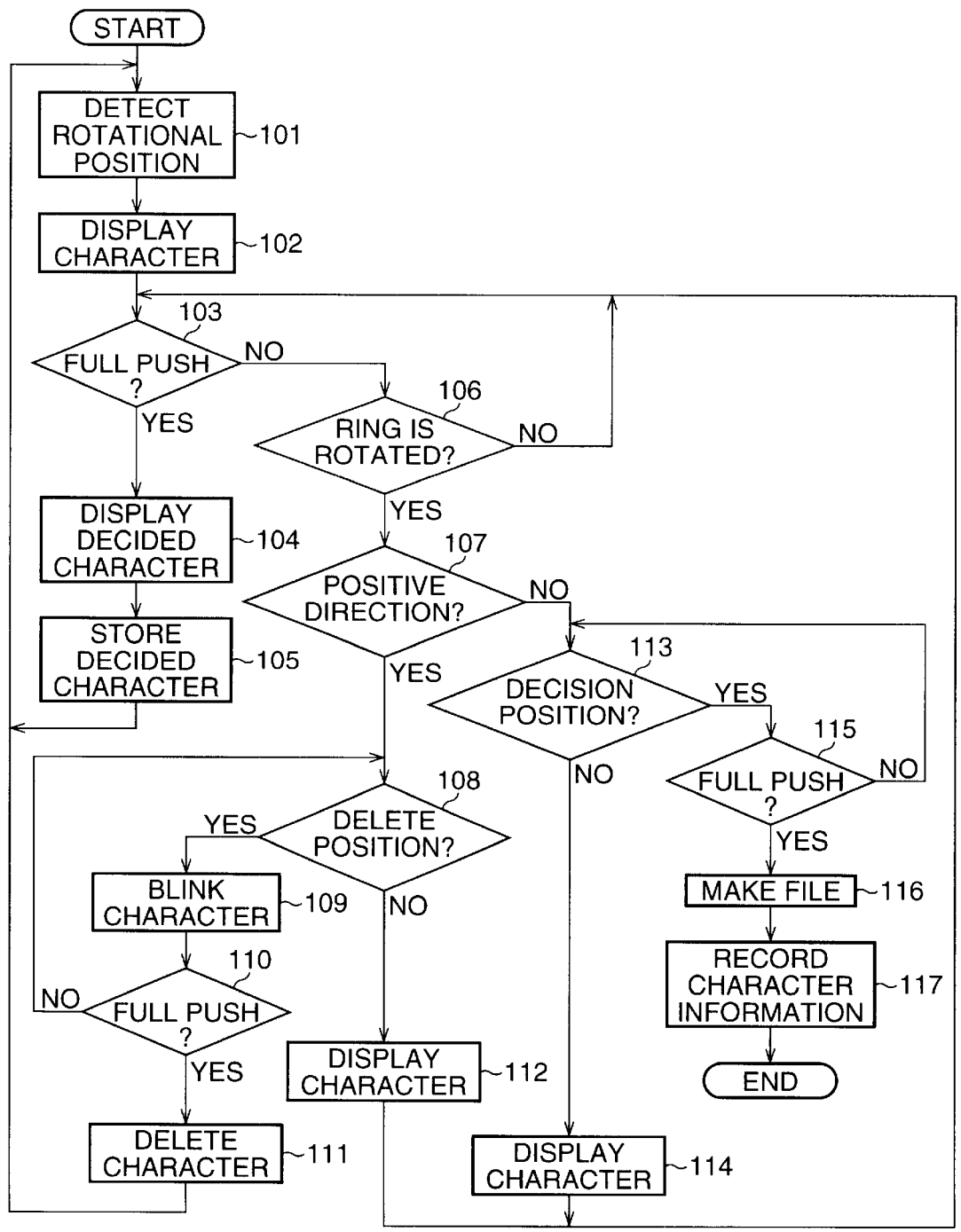
FIG. 4 is a flowchart showing a data-input process.
Figure 5:
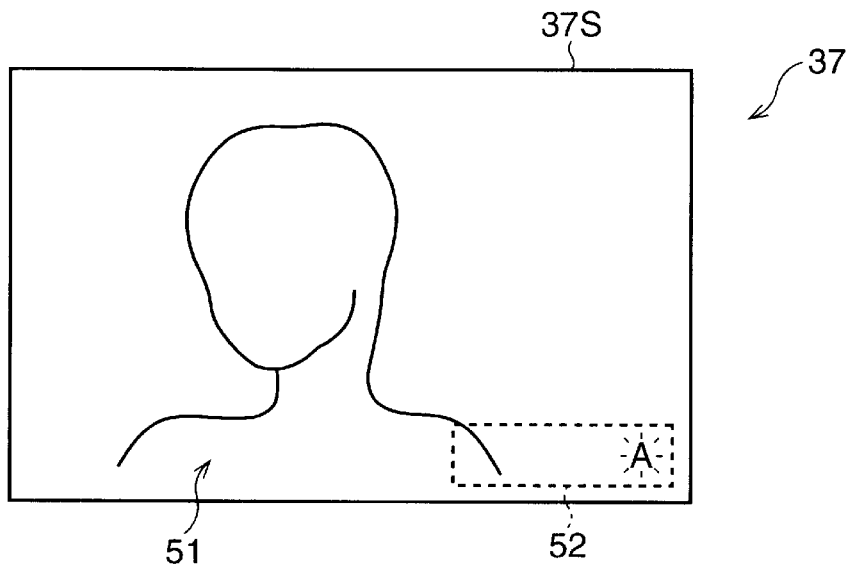
FIG. 5 is a view showing an object image and a selected character displayed on an LCD.
Figure 6:
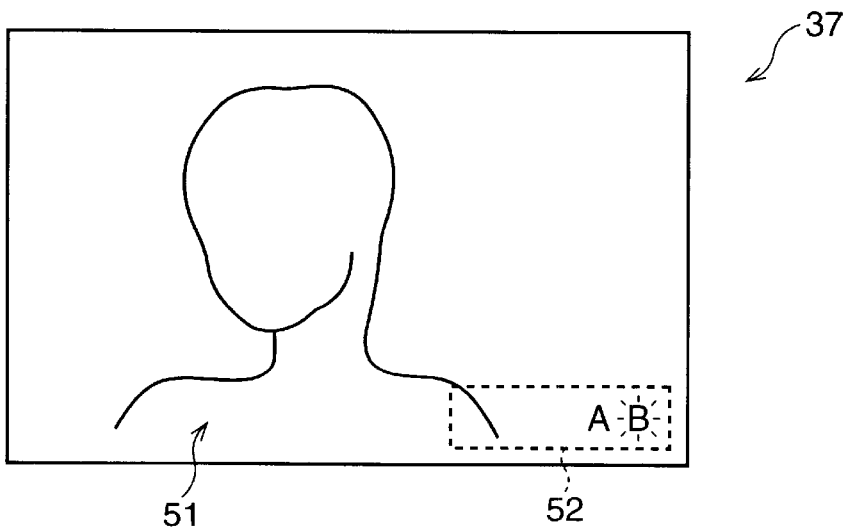
FIG. 6 is a view showing an object image and selected characters displayed on an LCD.
Figure 7:
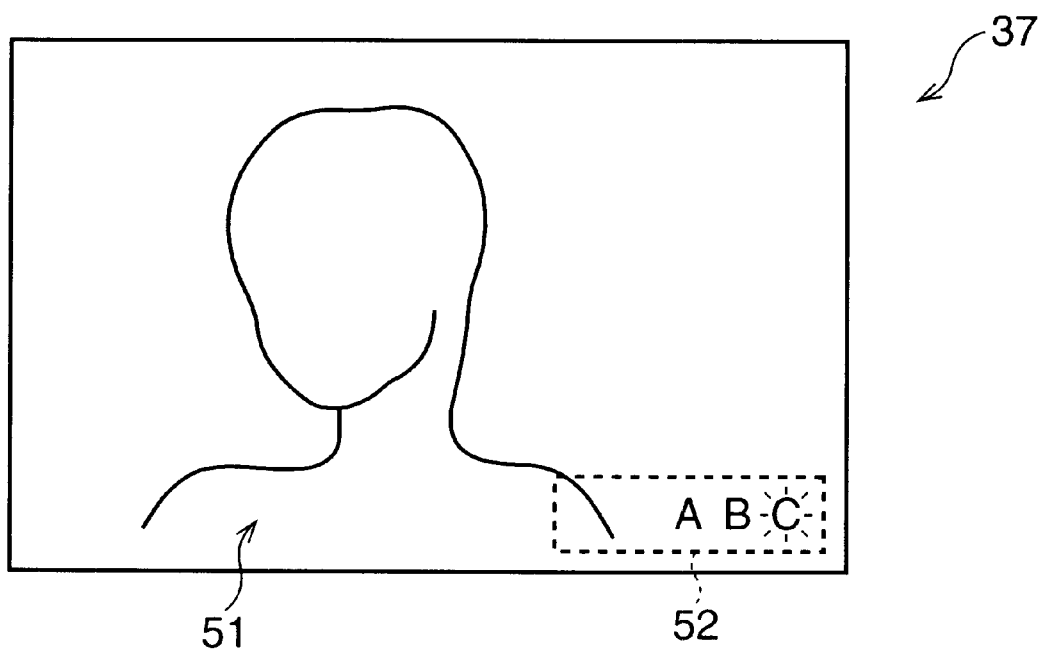
FIG. 7 is a view showing an object image and canceled character displayed on an LCD.

FIG. 4 is a flowchart showing a data-input process for inputting (setting) and recording the character information selected by the aperture and character setting ring 13. FIGS. 5 to 7 are views showing a screen on which the object image and the characters are displayed.

When the image-reproduction mode is selected by rotating the mode-selection dial 40, in a situation where the memory card 35 is installed in the card slot 36, one of the object images recorded in the memory card 35 can then be displayed on the LCD 37. The object image 51 displayed on the LCD 37 is selected from a plurality of object images recorded in the memory card 35 by pushing the up-button 41 and the down-button 42. Then, when the release button 43 is depressed halfway, the data-input process shown in FIG. 4 is started.

In Step 101, the rotational position of the aperture and character setting ring 13, relative to the base point, is detected by the rotary encoder 16. Each of characters stored in the character generator ROM as character codes has a particular rotational position. In other words, each character is assigned to a given rotational position of the ring 13. The operator selects one character from the series of characters by rotating the ring 13 to the corresponding rotational position. The rotary encoder 16 outputs the pulse signal to the system control circuit 20 in accordance with the rotational position of the ring 13. The selected character is detected, or recognized by the pulse signals received in the system control circuit 20. As described above, in this embodiment, characters displayed on the LCD 37 are Capital letters of the English alphabet "A to Z".

In Step 102, the character code data is read from the character generator ROM in the OSD circuit 38 by the system control circuit 20. The read character code data is superimposed onto the digital image data at the superimposing circuit 32 so that the object image and the selected character are displayed on the LCD 37. At this time, as shown in FIG. 5, the character (herein, the large letter "A") is displayed within a character area 52, which is located at the right-lower portion of a screen 37S of the LCD 37. Further, while the selected character is displaying, the character blinks ON and OFF, which indicates that the selected character is not decided. In Step 103, it is determined whether the release button 43 is fully pushed and the full-push switch 46 is turned ON. Namely, it is determined whether the selected character is decided by the operator.

When it is determined that the release button 43 is fully pushed at Step 103, the process goes to Step 104, in which the blinking character is stopped and the decided character is continuously displayed. At Step 105, the decided character code data is temporarily stored in a character data memory (not shown) provided in the system control circuit 20. After Step 105 is performed, the process returns to Step 101. Note that, when at least one character is decided, the character is shifted to the left by one figure worth, and a newly selected character is displayed at the initial input position, that is, the right hand end of the character area 52, at Step 102. For example, the letter "A" is decided and the letter "B" is selected, the letters "A" and "B" are displayed as shown in FIG. 6. In this embodiment, ten consecutive characters can be selected, displayed and recorded.

On the other hand, when it is determined that the release button 43 is not fully pushed at Step 103, the process goes to Step 106. In Step 106, it is determined whether the rotational position of the aperture and character setting ring 13 has changed. In other words, it is determined whether the aperture and character setting ring 13 was rotated by the operator such that another character has been selected. When it is determined that the rotational position of the ring 13 has not changed, the process returns to Step 103. On the other hand, when it is determined from the pulse signal of the rotary encoder 16 that the rotational position of the ring 13 has changed, the process goes to Step 107.

In Step 107, it is determined whether the ring 13 is rotated along a positive direction. Note that, the positive direction indicates the clockwise direction seen from the rear of the body 11. In this embodiment, when the ring 13 is rotated along the positive direction, the order of selected letters corresponds to the alphabet sequence "A, B, C, . . . , Y, Z". For example, the ring 13 is rotated by one letter worth along the positive direction when the letter "C" is blinking on the LCD 37, the blinking letter "C" is then replaced by the blinking letter "D". This positive position corresponds to a positive direction of address numbers in the character generator ROM in the OSD circuit 38.

When it is determined that the ring 13 is rotated along the positive direction at Step 107, the process goes to Step 108. In Step 108, it is determined whether the rotational position of the ring 13 is at a delete position for deleting the decided character, namely, it is determined whether the process for deleting the decided character is to be performed. The delete position is located at the end position along the positive direction.

When it is determined that the rotational position of the ring 13 is at the delete position at Step 108, the process goes to Step 109. In Step 109, the letter at initial input position blinks ON and OFF. For example, three letters "A, B, C" are set and decided, the letter "C" blinks ON and OFF, as shown in FIG. 7. In Step 110, it is determined whether the release button 43 is fully depressed. When it is determined that the release button 43 is fully depressed, the process goes to Step 111, in which the character at the initial input position is deleted from the screen 37S. After Step 111 is performed, the process returns to Step 101. On the other hand, when it is determined that the release button 43 is not fully depressed, the process returns to Step 108.

When it is determined that the rotational position of the ring 13 is not in the delete position at Step 108, the process goes to Step 112, in which the character code data corresponding to the detected rotational position is read from the character generator ROM and the blinking character is displayed on the LCD 37. After Step 112 is performed, the process returns to Step 103.

On the other hand, when it is determined that the aperture and character setting ring 13 is not rotated along the positive direction at Step 107, namely, the ring 13 is rotated along a negative direction, the process goes to Step 113. The negative direction is the counterclockwise direction as seen from the rear of the body 11, therefore, the sequence of selected characters becomes "Z, Y, X, . . . , A". In Step 113, it is determined whether the rotational position is at a decision position. The ring 13 is rotated to the decision position by the operator, to record the character information shown on the LCD 37 in the memory card 35. The decision position is located in the end of the character row along the negative direction.

When it is determined at Step 113 that the rotational position is not at the decision position, the process goes to Step 114, in which the character corresponding to the detected rotational position is displayed and flashes ON and OFF. After Step 114 is performed, the process returns to Step 103. On the other hand, when it is determined at Step 113 that the rotational position is the decision position, the process goes to Step 115.

In Step 115, it is determined whether the release button 43 is fully pushed. By performing Steps 101 to 114 repeatedly, the character information is set, and the set character information is recorded by fully depressing the release button 43. When it is determined that the release button 43 is not fully pushed, the process returns to Step 113. Conversely, when it is determined that the release button 43 is fully pushed, the process goes to Step 116. In Step 116, using the character code data stored in the memory in the system control circuit 20, a text file, which includes the decided character information, is made so that a personal computer can use the character information. Further, a text file name corresponding to the displayed object image is set. Then, in Step 117, the character information is recorded in the memory card 35 as data via the card controller 31, and the character information is deleted from the LCD 37. After Step 117 is performed, the data-input process is terminated.

As described above, in the first embodiment, the character information composed of a plurality of characters is set by using the aperture and character setting ring 13 and is then recorded in the memory card 35 with the object image as additional data. As shown in Steps 101 to 114, during the setting of the character information, each character is selected by rotating the ring 13. By utilizing the aperture and character setting ring 13 for selecting the characters, selection is rapidly performed compared to the push-button or cross key method. Further, in this embodiment, an aperture-setting ring, which is usually provided on the surface of the interchangeable lens barrel, is utilized for setting characters, whereby a separate character-selecting ring for selecting the character should not be needed.

Note that, other characters, such as the small letters of the English Alphabet, Greek alphabet, numerical, special letter (for example "?"), graphical mark (sign), etc., and further a combination of those characters may be prepared in the character generator ROM as data and may be selected by rotating the aperture and character setting ring 13.

Characters prepared in the character generator ROM may be marked around the ring 13 in place of the LCD display. In this case, the operator selects a marked character.

The data-input mode and image reproduction mode may be exchanged with each other by rotating the mode-selection dial 40 in place of half-depressing of the release button 43.

An exclusive and separate button, which is operated for deciding the character information, may be provided on the body 11 in place of the release button 43.

Figure 8:
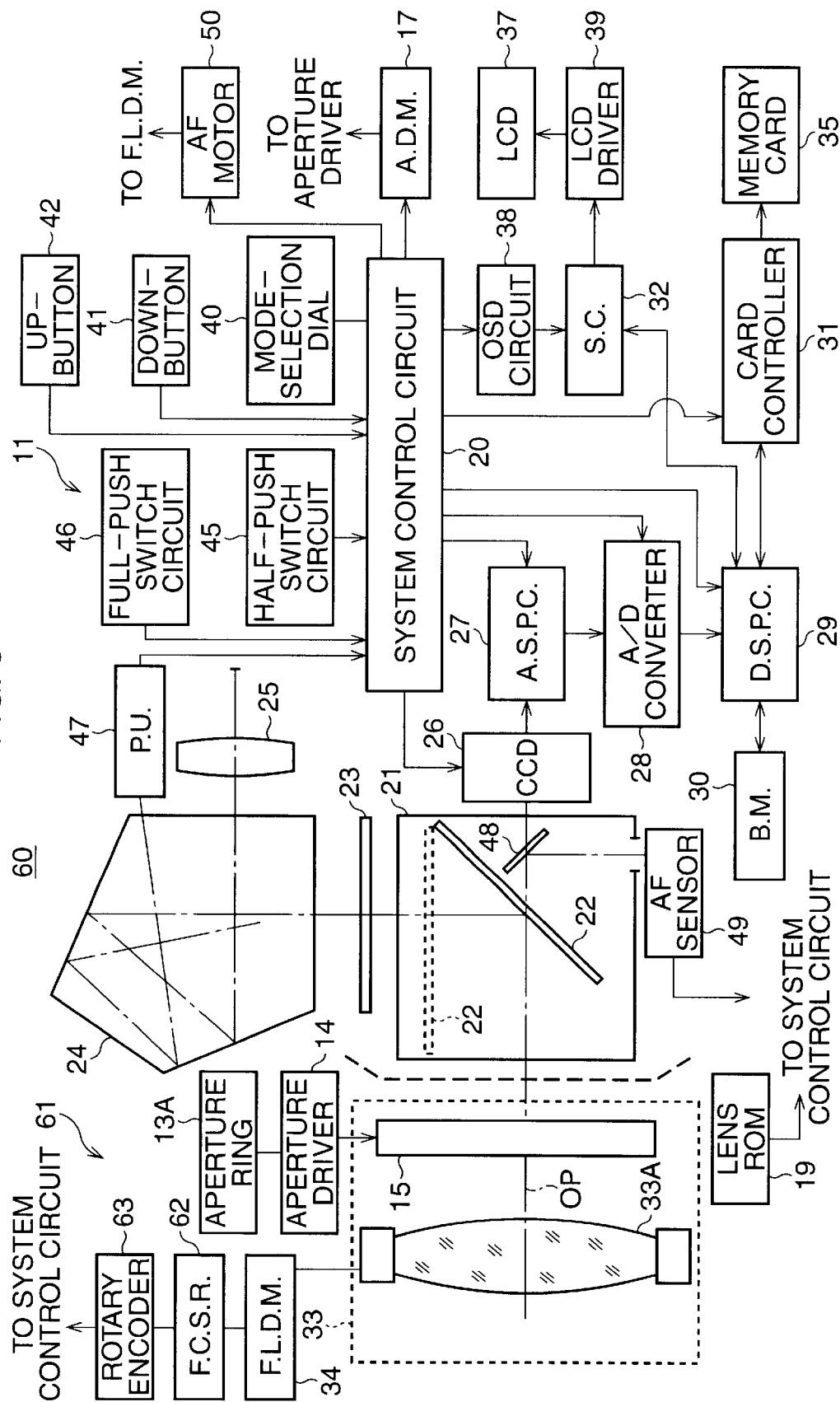
FIG. 8 is a block diagram of a digital still camera of a second embodiment.

With reference to FIG. 8, a second embodiment of the present invention is explained. The second embodiment is different from the first embodiment in that a focus lens ring for manually focusing the object image operates as a data-input ring. Other portions are similar to those of the first embodiment, designations remain the same and descriptions are omitted.

FIG. 8 is a block diagram of a digital still camera of the second embodiment. The digital still camera 60 has a lens barrel 61, the lens barrel 61 detachably attached to a body 11. The lens barrel 61 has a rotary encoder 63 and a focus and character setting ring 62. An exclusive aperture ring 13A for manually setting the aperture value is also provided on the outer surface of the lens barrel 61. When the photographing mode is select, the focus and character setting ring 62, provided on the outer surface, or the outer circumference of the lens barrel 61, is rotated to focus the object image, whereby the group of focus lenses is shifted along the optical axis OP.

Similarly to the first embodiment, each character has a particular rotational position with respect to the focus and character setting ring 62. Therefore, when the image reproduction mode is selected, the rotational position of the ring 62 is detected by the rotary encoder 63, whereby the selected character is displayed on the LCD 37. The displayed character is changed by rotating the ring 62. When the release button 43 is fully depressed, the character is decided.

Figure 9:
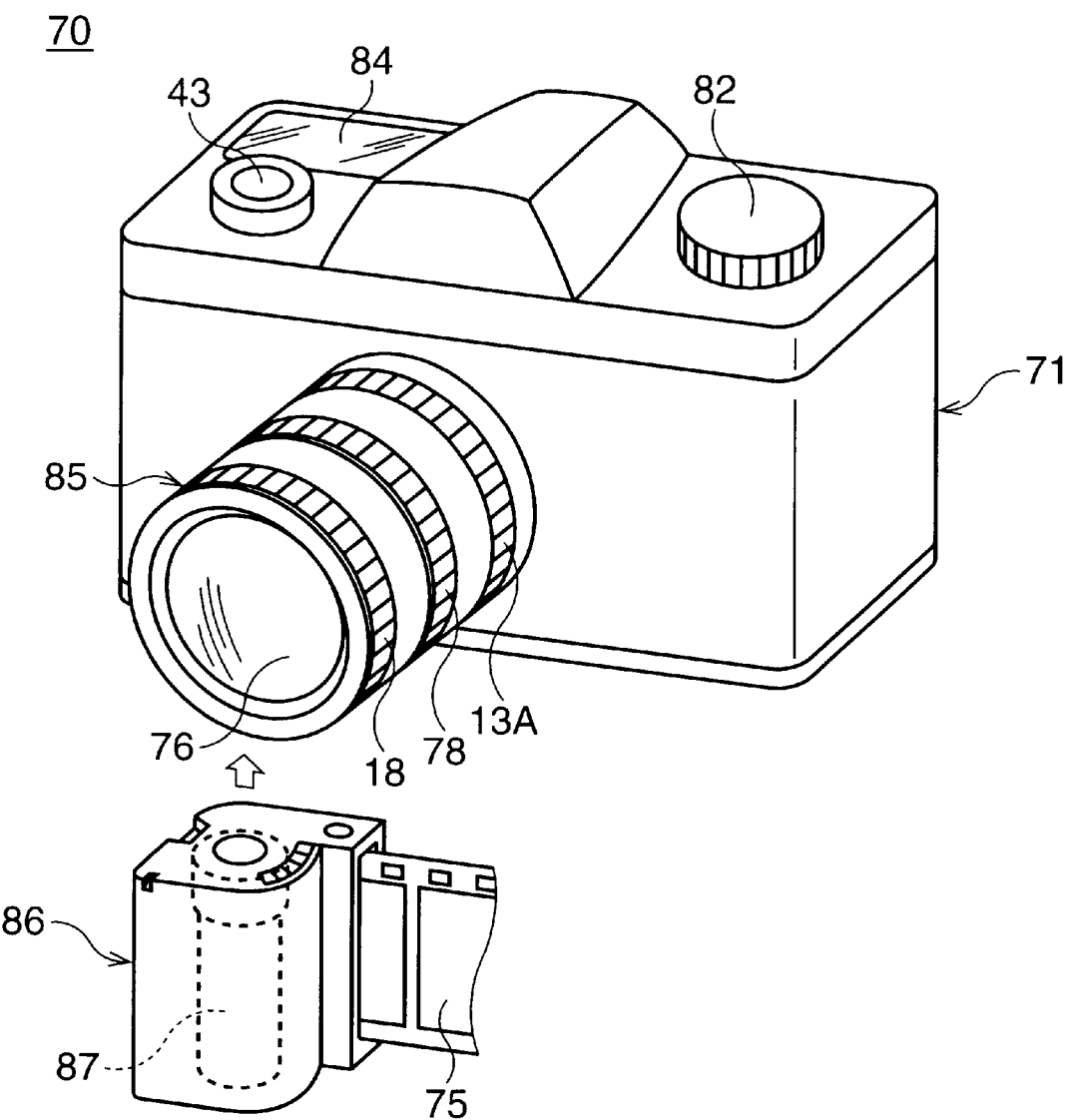
FIG. 9 is a perspective view of an APS camera of a third embodiment.
Figure 10:
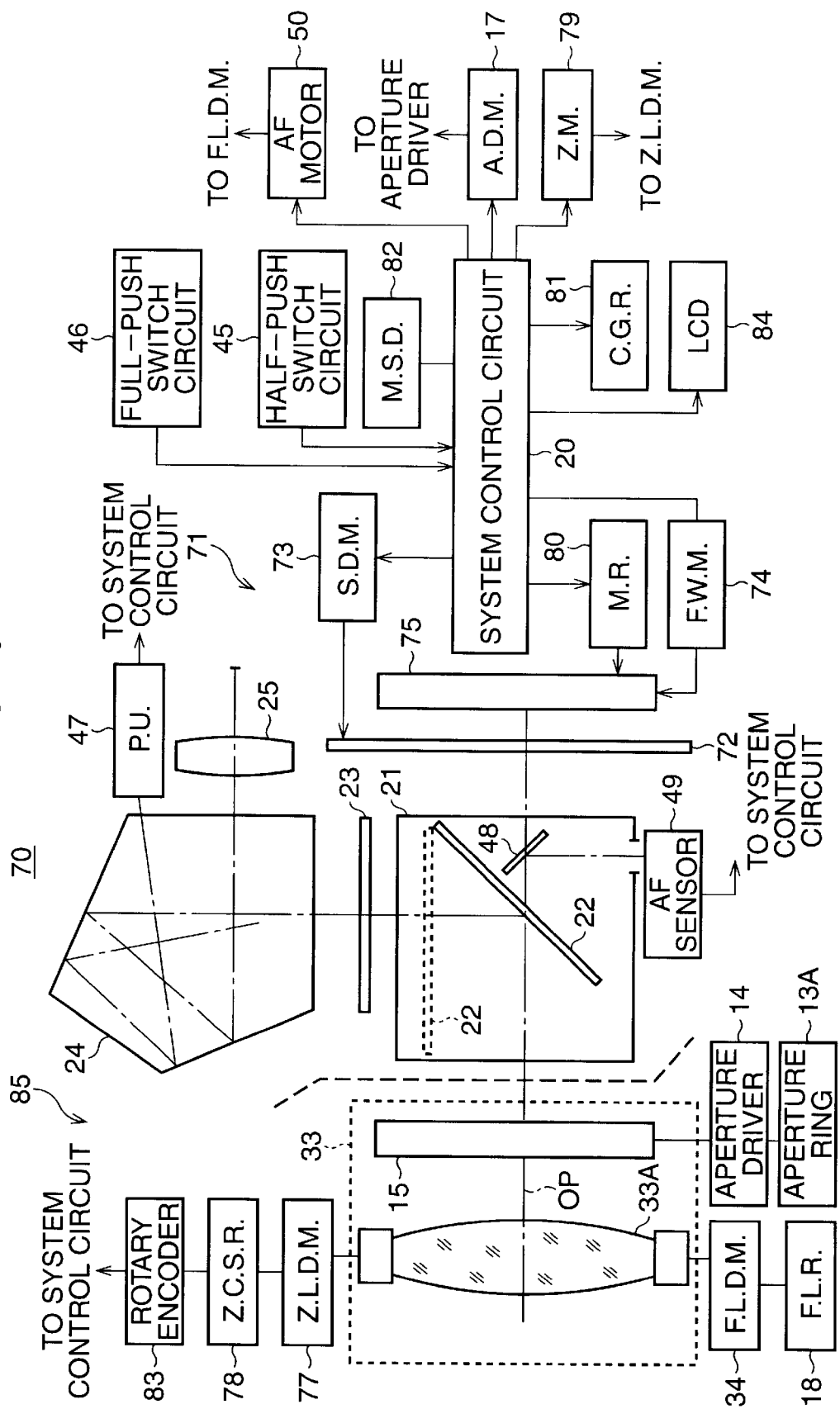
FIG. 10 is a block diagram of the APS camera of the third embodiment.

With reference to FIGS. 9 and 10, a third embodiment of the present invention is explained. The third embodiment is different from the first and second embodiments in that an APS (Advanced Photo System) type camera is applied as a camera. Other portions are similar to those of the first embodiment, designations remain the same and descriptions are omitted.

FIG. 9 is a perspective view showing an APS type camera of the third embodiment. FIG. 10 is a block diagram of the APS camera. Note that, in this embodiment, the APS type camera 70 is a SLR type camera similar to the first embodiment.

In the case of the APS type camera, a photographic film 75 for the APS is used. Therefore, in a body 71 of the camera 70, a focal plane shutter 72 is provided at the rear of the mirror box 21, the focal plane shutter 72 opened and closed by a shutter drive mechanism 73. Further, a film winding motor 74 is provided in a body 71 of the APS type camera 70, whereby the photographic film 75 is shifted along a shifting path located at the rear of the focal plane shutter 72.

The photographic film 75 is installed in a film cartridge 86 as shown in FIG. 9. When the film cartridge 86 is accommodated in the body 71, a spool 87 in the cartridge 86 is rotated by the film winding motor 74, whereby the photographic film 75 passes thorough the shifting path and wound toward a body spool (not shown) provided in the body 71. When the photographing mode is selected and the release button 43 is fully pushed, the focal plane shutter 72 opens for a predetermined period corresponding to a preset shutter speed, so that an exposure area of the photographic film 75 is exposed. Then, the photographic film 75 is wound toward the body spool by one frame worth, whereby the next frame of the film 75 is located at a position to be exposed. When winding the photographic film 75 off, the photographic film 75 is wound toward opposite side, namely, the spool 87 in the cartridge 86 by the film winding motor 74.

In this embodiment, the APS type camera 70 has a group of zoom lenses 76 for varying the focal length in the photographing lenses 33A. The group of zoom lenses is driven by a zoom lens drive mechanism 77. Further, a zoom and character setting ring 78 is provided on the outer surface of the lens barrel 85. The focal length is manually varied by rotation of the zoom and character setting ring 78. Further, the focal length may be also automatically varied by driving a zooming motor 79 connected to the zoom lens drive mechanism 77.

As well known, a magnetic recording layer is provided on a part of the photographic film 75 for the APS, by a coating process. In the magnetic recording layer, photographing data associated with photographing conditions, such as a date, a size of the angle of view is recorded. The above photographing data is recorded in the magnetic recording layer, while the photographic film 75 is wound up by one frame after the object image is recorded in the photographic film 75.

Further, with the APS type photographic film 75, a comment associated with the recorded object image may be recorded in the magnetic recording layer. Herein, various comments are prepared, for example, the comments "Birthday", "Congratulation" or the like are included. When the comment is determined as described later, the rewinding process for recording the comment is performed. In the rewinding process, the photographic film 75 is wound backward to record the comment into the magnetic recording layer under the object image, which is associated with the determined comment. A series of comments are stored in a character generator ROM 81 as data, each comment having an address number. A selected comment is recorded in the magnetic recording layer on the photographic film 75 by a magnetic recorder 80, whereby the selected comment is printed at the back surface of the photograph when the photograph is printed, as is well known.

On the body 71, a mode-selection dial 82 is provided as shown in FIG. 9. The mode-selection dial 82 selects one of the manual exposure mode, the automatic exposure mode and the comment mode in accordance with the rotational position of the mode-selection dial 82. When the comment mode is selected, the zoom and character setting ring 78 operates as a ring for selecting the comment to be recorded in the magnetic recording layer. A rotary encoder 83 detects a rotational position of the ring 78, and the pulse signal is fed to the system control circuit 20. In accordance with the fed pulse signal, comment data corresponding to the rotational position is read from the character generator ROM 81. The comment is then displayed on an LCD 84 provided on the upper surface of the body 71 (See FIG. 9).

Note that, a comment number may be displayed on the LCD 84 in place of the comment itself. For example, the comment number may be the same as the address number of the comment data in the character generator ROM 81. In this case, each comment has a particular number and the operator selects the number by rotating the ring 78. At this time, the operator refers to a table of the relationship between the comments and the comment number.

Similarly to the first embodiment, when the release button 43 is halfway depressed, the data-input process is started. The comment is changed by rotating the ring 78. Each comment has a particular rotational position around the ring 78, similarly to the first embodiment, the comment data corresponding to the rotational position is read from the character generator ROM 81, and the selected comment is then displayed on the LCD 84. When the release button 43 is fully pushed, the comment displayed on the LCD 84 is determined as a comment to be recorded in the magnetic recording layer. Consequently, the rewinding process is performed. Namely, the photographic film 75 is wound backward, namely, toward the spool 87 in the film cartridge 86 such that the comment can be recorded in the magnetic recording layer under the corresponding object image, the comment is then recorded in the magnetic recording layer by the magnetic recorder 80 while the photographic film 75 is wound up, or forward by one frame.

In this way, in the third embodiment, the comment is selected by rotation of the zoom and character setting ring 78. Note that, the character generator ROM in the OMD circuit 38 shown in the first embodiment may be applied to the third embodiment in place of the character generator ROM 81. In this case, corresponding characters, from which the comment is composed, are read from the character generator ROM respectively such that the comment is displayed and recorded.

In this embodiment, the character information is restricted to the comments, any another character information may be selected by the ring 78.

Figure 11:
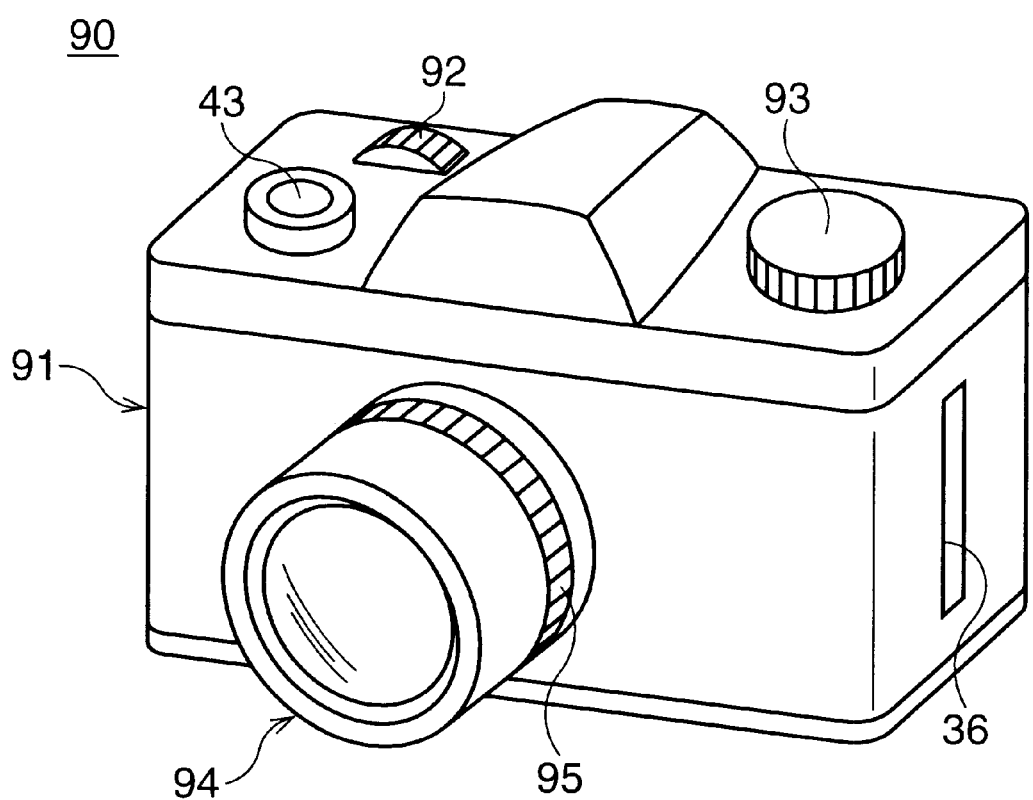
FIG. 11 is a perspective view of a digital still camera of a fourth embodiment.
Figure 12:
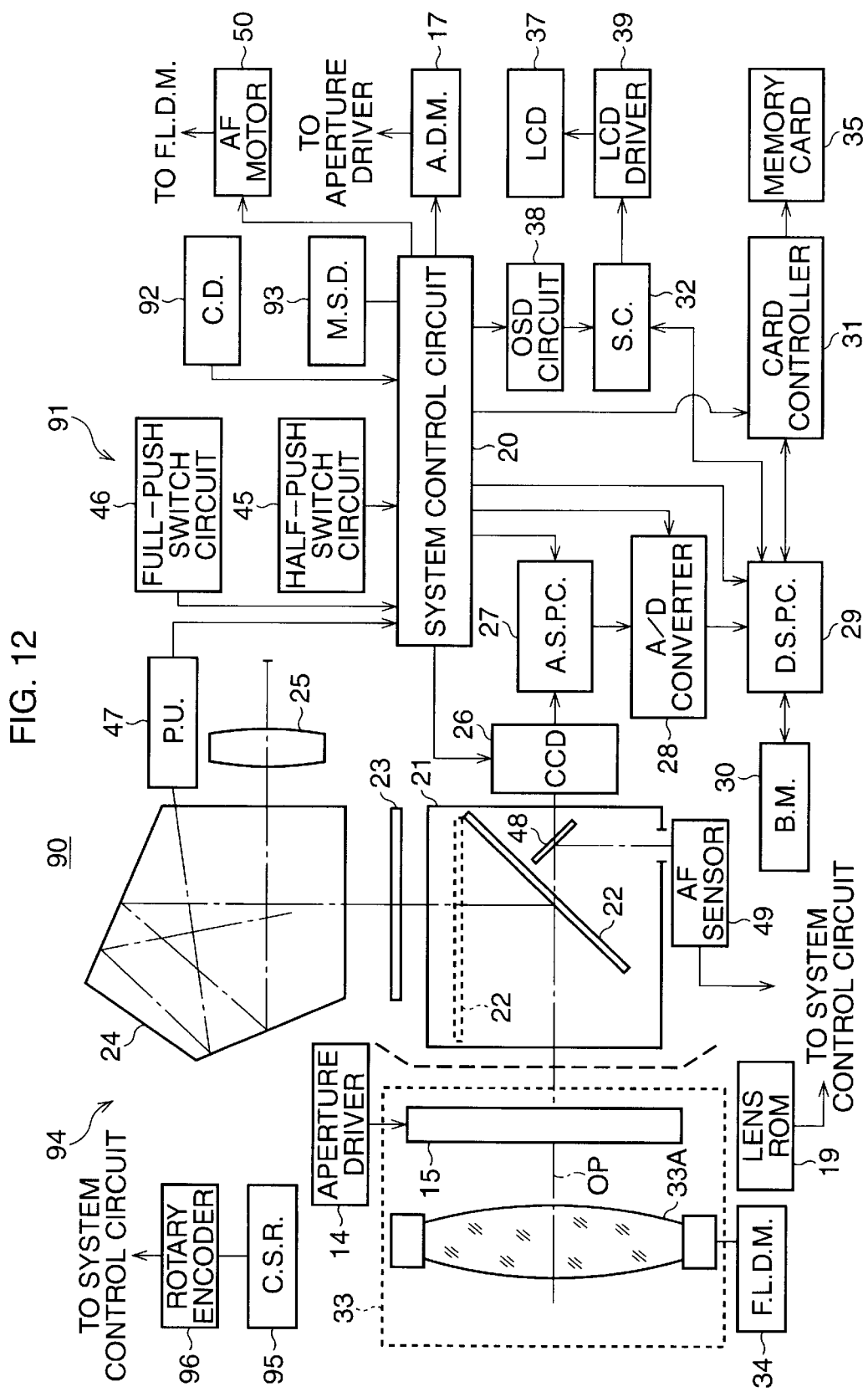
FIG. 12 is a block diagram of the digital still camera of the fourth embodiment.

With reference to FIGS. 11 and 12, the fourth embodiment is explained. In the first, second and third embodiment, the ring for changing the photographing condition, namely, the aperture value, the focus point or the focal length also functions as a ring for setting the character information or the comment. The fourth embodiment is different from the first, second and third embodiments in that an exclusive ring for selecting the character is provided on the lens barrel. Other portions are similar to those of the first embodiment, designations remain the same and descriptions are omitted.

FIG. 11 is a perspective view showing a digital still camera of the fourth embodiment. FIG. 12 is a block diagram of the digital still camera of the fourth embodiment.

A digital still camera 90 has a command dial 92 and a lens barrel 94. In this embodiment, a character setting ring 95 only is provided on the outer surface of the lens barrel 94 and the focusing and the aperture value therefore can only be automatically adjusted. The command dial 92 for setting the aperture value and shutter speed is provided on the upper surface of a body 91. The mode-selection dial 93 selects one of a photographing mode, an image reproduction mode and an exposure-setting mode. The exposure period is set by the command dial 92.

The character setting ring 95 is rotatably provided on the outer circumference of the lens barrel 94. When the image reproduction mode is selected, the character setting ring 95 operates as a ring for selecting a character, similar to the first embodiment. Namely, a rotary encoder 96 detects the rotational position of the character setting ring 95 so that the character corresponding to the rotational position is selected and displayed on the LCD 37 with the object image. When the displayed character is determined by depressing the release button 43 fully, the character information is recorded in the memory card 35 such that s personal computer can recognize the character information, similar to the first embodiment.

Note that, in addition to the character setting ring 95, an aperture ring, zoom ring and focus lens ring may be provided on the outer surface of the lens barrel 94. Further, this embodiment may also apply to an APS type camera in place of the digital still camera.

With reference to FIGS. 13, 14, 15A and 15B, the fifth embodiment is explained. The fifth embodiment is different from the first to fourth embodiments in that a ring provided on the outer circumference of the lens barrel is utilized for selecting the character and the displayed object image. Other portions are similar to those of the first embodiment, designations remain the same and descriptions are omitted.

Figure 13:
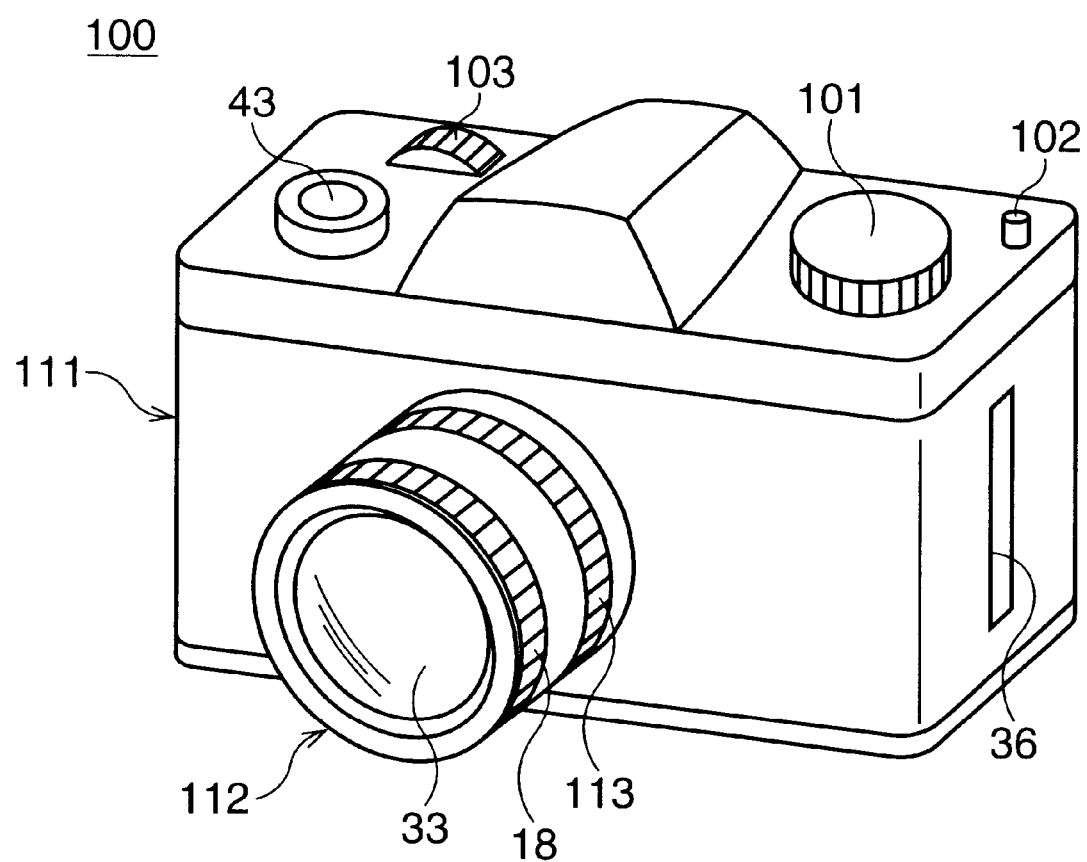
FIG. 13 is a perspective view of a digital still camera of a fifth embodiment.
Figure 14:
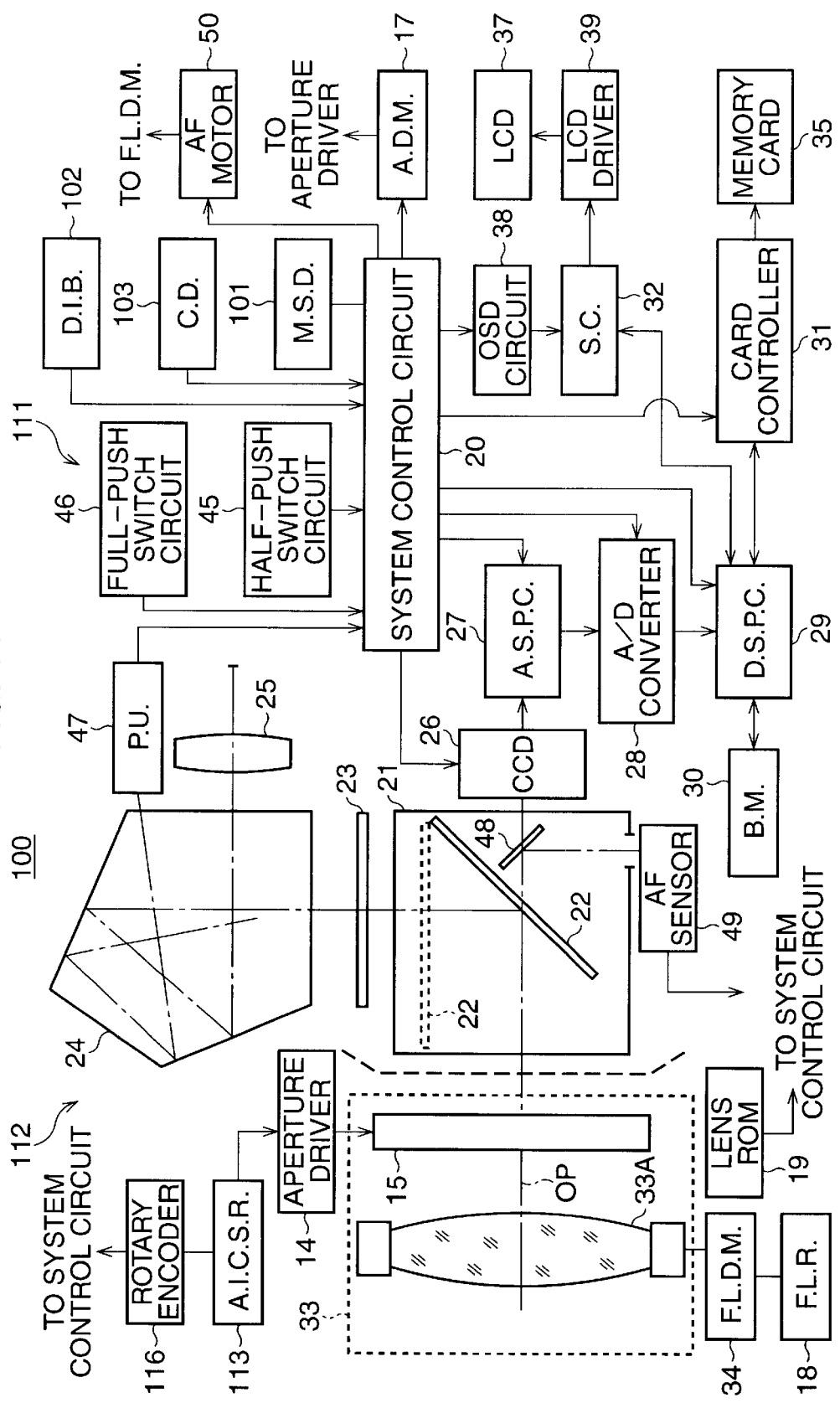
FIG. 14 is a block diagram of the digital still camera of the fifth embodiment.

FIG. 13 is a perspective view of a digital still camera of the fifth embodiment. FIG. 14 is a block diagram of the digital still camera of the fifth embodiment.

A mode-selection dial 101 provided on a body 111 of the digital still camera 100 selects one of a photographing mode, an image reproduction mode and an exposure setting mode. The command dial 103 is provided for setting the exposure period, in other words, the shutter speed. Further, a data-input button 102 is provided on the upper surface of the body 111. When the data-input selecting button 102 is depressed during the image reproduction mode, data-input process is performed, as described later.

During the photographing mode, an aperture-image-character setting ring 113, provided on the outer circumference of the lens barrel 112, is rotated to set the aperture value. On the other hand, when the image-reproduction mode is selected, the ring 113 operates to selects an object image, from amongst a plurality of object images, to be displayed on the LCD 37. Further, when the data-input button 102 is pushed while the image reproduction mode is select, the mode is changed to the data-input mode, whereby the ring 113 operates to select characters. A rotary encoder 116 detects the rotational position of the ring 113 and a system control circuit 20 controls a digital signal process circuit 29 and a card controller 31 so that the object image corresponding to the rotational position is displayed on the LCD 37.

Figure 15A:
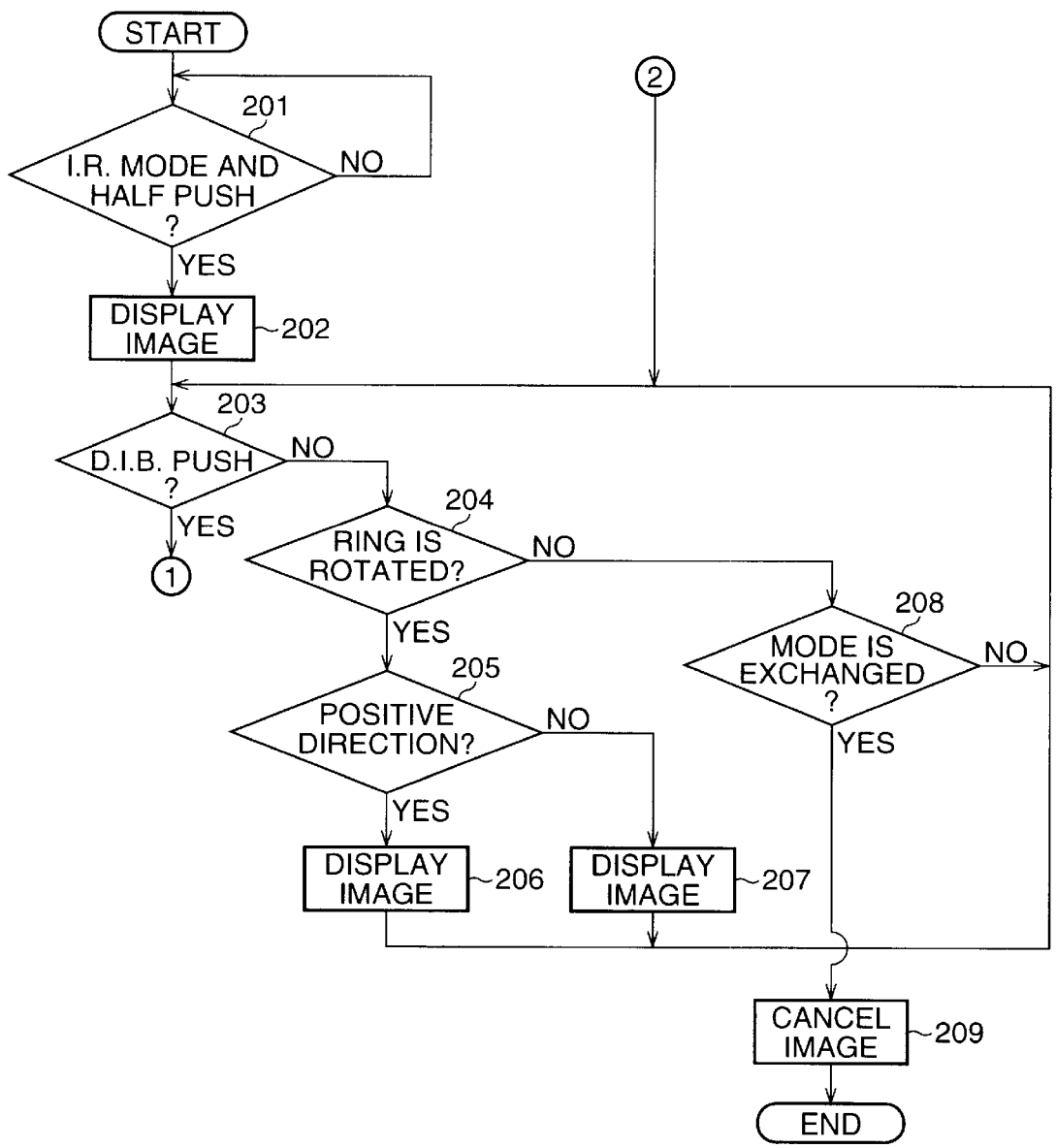
FIGS. 15A and 15B are flowcharts showing an image-reproduction process and a data-input process.
Figure 15B:
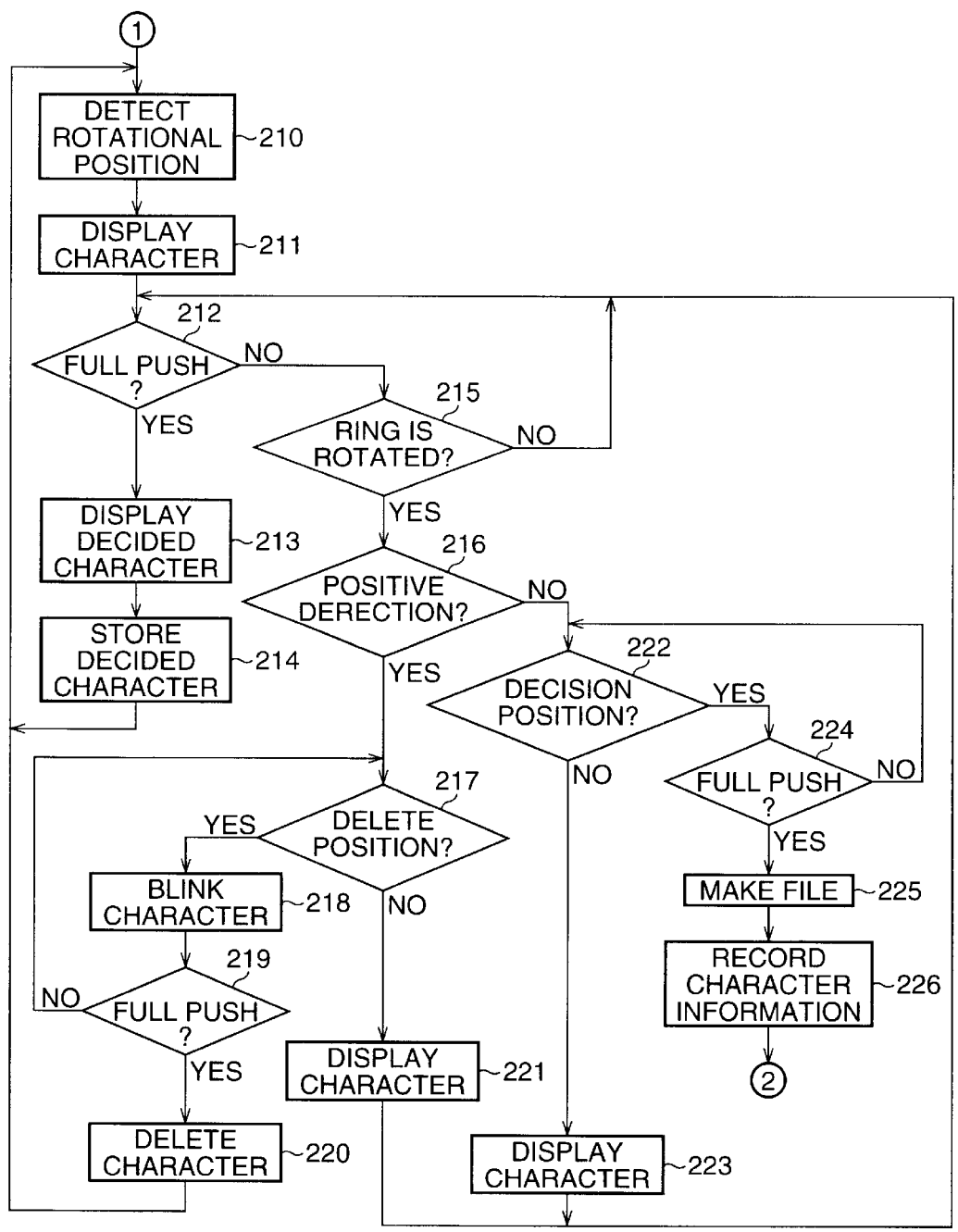

FIGS. 15A and 15B are flowcharts showing image-reproduction and data-input processes. FIG. 15A shows an image-reproduction process and FIG. 15B shows the data-input process. Note that, the memory card 35 is already installed in the card slot 36.

In Step 201, it is determined whether the image reproduction mode is selected. Namely, it is determined whether the mode-selection dial 101 is rotated such that the image reproduction mode is selected and the release button 43 is halfway depressed. When it is determined that image reproduction mode is selected and the release button 43 is halfway pushed, the process goes to Step 202. On the other hand, when it is determined that image reproduction mode is not selected or the release button 43 is not halfway pushed with the image-reproduction mode selected, Step 201 is repeatedly performed.

In Step 202, the object image data is read from the memory card 35 and the object image corresponding to the rotational position of the ring 113 is displayed on the LCD 37. Similarly to the selection of the character described in the first embodiment, each of the recorded images corresponds to a particular rotational position. Therefore, the object image, the frame number of which corresponds to the rotational position, is displayed on the LCD 37. Note that, in this embodiment, when the ring 113 is rotated along the positive direction, the frame number of the displayed object image increases along the positive direction (clockwise direction) of the ring 113, inversely, the frame number of the displayed object image decreases when the ring 113 is rotated along the negative direction. After Step 202 is performed, the process goes to Step 203. In Step 203, it is determined whether the data-input button 102 is pushed.

When it is determined that the data-input button 102 is pushed at Step 203, the process goes to Step 210 shown in FIG. 15B. Steps 210 to 226 correspond to Steps 101 to 117, namely, the character information is set and recorded in the memory card 35, similarly to the first embodiment. After Step 226 is performed, the process returns to Step 203 shown in FIG. 15A.

On the other hand, when it is determined that the data-input button 102 is not pushed at Step 203, namely, the data-input process is not performed, the process goes to Step 204, wherein it is determined in accordance with the pulse signal from the rotary encoder 116 whether the ring 113 was rotated.

When it is determined that the ring 113 was rotated at Step 204, the process goes to Step 205. In Step 205, it is determined whether the ring 113 is rotated along the positive direction, or clockwise direction seen from the rear of the body 111. When it is determined that the ring 113 is rotated along the positive direction, the process goes to Step 206, in which the object image data, the frame number of which corresponds to the detected rotational position, is read from the memory card 35 and the selected object image is displayed on the LCD 37. On the other hand, when it is determined that the ring 113 is not rotated along the positive direction at Step 205, namely, the ring 113 is rotated along the negative direction, the process goes to Step 207, wherein the displayed object image is changed to another object image, the frame number of which is smaller and corresponds to the rotational position of the ring 113. After Step 206 or 207 is performed, the process returns to Step 203. Note that, when only one image is recorded in the memory card 35, the displayed object image is not changed.

On the other hand, when it is determined that the ring 113 is not rotated at Step 204, the process goes to Step 208, in which it is determined whether an another mode is selected by the mode-selection dial 101. When it is determined that the image reproduction mode is not terminated, the process returns to Step 203. Conversely, when it is determined that the image reproduction mode is terminated, the process goes to Step 209, in which the object image is deleted from the LCD 37. When Step 209 is performed, the process is terminated.

In this way, in this embodiment, the object image to be displayed on the LCD 37 is selected by the aperture-image-character setting ring 113, whereby the displayed object images are exchanged rapidly. Note that, an exclusive ring for selecting the object image maybe provided on the outer circumference of the lens barrel 112, similar to the fourth embodiment. Further, any combination of rings for selecting the object image, characters and the photographing condition (aperture value, focusing or focal length) may be provided at the lens barrel.

In this embodiment, the image reproduction mode is changed to the data-input mode by depressing the data-input button 102. The data-input button 102 may change the input-data mode to the image reproduction mode, conversely. Further, the data-input mode and the image reproduction mode are exchanged with each other by rotating the mode-selection dial 101.

In the first to fifth embodiments, the lens barrel with the photographing optical system is an interchangeable lens barrel, and the type of camera is a SLR type camera. However, a lens barrel, which is fixed to the body and is not interchangeable, may be utilized. Further, other types of camera (for example, range finder type camera) maybe utilized in place of the SRL type camera.

In the third embodiment, a comment is selected from a plurality of comments. The selection of the comment may be applied to other embodiments, in which a digital still camera is utilized, in place of selecting the characters. Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No. 2000-029240 (filed on Feb. 7, 2000), which is expressly incorporated herein, by reference, in its entirety.

What is claimed is:

1. A camera having a body and a lens barrel with a photographing optical system, said photographing optical system forming an object image, said object image being recorded to a recording medium detachably installed in said body, said camera comprising:

a rotating ring that is rotatably provided on an outer circumference of said lens barrel;

a rotational position detector that detects a rotational position of said rotating ring;

a character memory, in which a plurality of characters is stored, character information, associated with the object image and defined on the basis of the plurality of characters, being set by an operator;

a character information recorder that selectively reads characters, corresponding to said character information, from the plurality of characters stored in said character memory, and records said character information in said recording medium as additional data; and a mode selector for selecting one mode from at least a photographing mode for recording the object image and a data-input mode for setting and recording said character information;

wherein said rotating ring operates as a device for setting a photographing condition when said photographing mode is selected, said photographing condition being changed in accordance with the rotational position of said rotating ring, and wherein said rotating ring operates as a device for setting said character information when said data-input mode is selected, said character information to be recorded in said recording medium being set in accordance with the rotational position of said rotating ring.

2. The camera of claim 1, wherein said lens barrel includes an aperture that opens and closes by rotation of said rotating ring and said photographing condition corresponds to an aperture value, said rotating ring being rotated for setting the aperture value when the photographing mode is selected.

3. The camera of claim 1, wherein said lens barrel includes a zoom lens that shifts along an optical axis of said photographing optical system by rotation of said rotating ring and said photographing condition corresponds to a focal length, said rotating ring being rotated for changing the focal length when the photographing mode is selected.

4. The camera of claim 1, wherein said lens barrel includes a focus lens that shifts along an optical axis of said photographing optical system by rotation of said rotating ring and said photographing condition corresponds to a focusing condition, said rotating ring being rotated for focusing the object image when the photographing mode is selected.

5. The camera of claim 1, further comprising are lease button for activating a process to record the object image in said recording medium at said photographing mode, wherein a record of said character information to said recording medium is decided by depression of said release button at said data-input mode.

6. The camera of claim 1, further comprising a display that displays said character information with the object image, said character information being displayed while said data-input mode is selected.

7. The camera of claim 1, wherein each of the plurality of characters is assigned to a particular rotational position of said rotating ring, one character being selected from the plurality of characters in accordance with the rotational position of said rotating ring, said character information being set by selecting one character by one character.

8. The camera of claim 7, further comprising a display that displays said character information with the object image, said selected character being displayed on said display.

9. The camera of claim 1, wherein a plurality of sets of character information is prepared and each of the plurality of sets of character information is assigned to a particular rotational position of said rotating ring, said character information being selected from the plurality of sets of character information in accordance with the rotational position of said rotating ring.

10. The camera of claim 9, wherein the plurality of sets of character information correspond to a plurality of comments, one comment being selected from the plurality of comments in accordance with the rotational position of said rotating ring.

11. The camera of claim 10, further comprising a display that displays said character information with the object image, said selected comment being displayed on said display.

12. The camera of claim 1, wherein said camera is a digital still camera having an image sensor and said recording medium is a card type memory, the object image being formed on said image sensor, said object image being recorded in said card type memory as image data.

13. The camera of claim 1, wherein said camera is an APS (Advanced Photo System) type camera and said recording medium is a photographic film for the APS, which includes a magnetic recording layer, said character information being recorded in said magnetic recording layer.

14. A camera having a body and a lens barrel with a photographing optical system, said photographing optical system forming an object image, said object image being recorded to a recording medium detachably installed in said body, said camera comprising:

a rotating ring that is rotatably provided on an outer circumference of said lens barrel;

a rotational position detector that detects a rotational position of said rotating ring;

a character memory, in which a plurality of characters is stored, character information, associated with the object image and defined on the basis of the plurality of characters, being set by an operator; and a character information recorder that selectively reads characters, corresponding to said character information, from the plurality of characters stored in said character memory, and records said character information in said recording medium as additional data;

wherein said rotating ring comprises a setter that sets said character information, said character information recorder reading the characters and recording the character information in accordance with the rotational position of said rotating ring.

15. The camera of claim 14, further comprising a mode selector for selecting one mode from at least a photographing mode for recording the object image and a data-input mode for setting and recording said character information;

wherein said character information to be recorded in said recording medium being set when said data-input mode is selected.

16. The camera of claim 15, further comprising a release button for activating a process to record the object image in said recording medium at said photographing mode, wherein a record of said character information to said recording medium is decided by depression of said release button at said data-input mode.

17. The camera of claim 15, further comprising a display that displays said character information with the object image, said character information being displayed while said data-input mode is selected.

18. The camera of claim 14, wherein each of the plurality of characters is assigned to a particular rotational position of said rotating ring, one character being selected from the plurality of characters in accordance with the rotational position of said rotating ring, said character information being set by selecting one character by one character.

19. The camera of claim 18, further comprising a display that displays said character information with the object image, said selected character being displayed on said display.

20. The camera of claim 14, wherein a plurality of sets of character information is prepared and each of the plurality of sets of character information is assigned to a particular rotational position of said rotating ring, said character information being selected from the plurality of sets of character information in accordance with the rotational position of said rotating ring.

21. The camera of claim 20, wherein the plurality of sets of character information correspond to a plurality of comments, one comment being selected from the plurality of comments in accordance with the rotational position of said rotating ring.

22. The camera of claim 21, further comprising a display that displays said character information with the object image, said selected comment being displayed on said display.

23. The camera of claim 14, wherein said camera is a digital still camera having an image sensor and said recording medium is a card type memory, the object image being formed on said image sensor, said object image being recorded in said card type memory as image data.

24. The camera of claim 14, wherein said camera is an APS (Advanced Photo System) type camera and said recording medium is a photographic film for the APS, which includes a magnetic recording layer, said character information being recorded in said magnetic recording layer.

25. A camera having a body and a lens barrel with a photographing optical system, a plurality of object images being recorded in a recording medium detachably installed in said body, said camera comprising:

an image reproduction displayer that selectively reads one object image from the plurality of object images recorded in said recording medium and displays the selected object image on a display provided on said camera;

a rotating ring that is rotatably provided on an outer circumference of said lens barrel; and a rotational position detector that detects a rotational position of said rotating ring;

wherein said rotating ring comprises a selector that selects an object image to be displayed on said display from the plurality of object images, the image reproduction displayer reading and displaying one object image in accordance with the rotational position of said rotating ring.

26. The camera of claim 25, wherein each of the plurality of object images is assigned to a particular rotational position of said rotating ring, one object image being selected from the plurality of object images in accordance with the rotational position of said rotating ring.

27. The camera of claim 25, further comprising a mode selector for selecting one mode from at least a photographing mode for recording the object image and an image reproduction mode for displaying the object image;

wherein said rotating ring operates as a device for setting a photographing condition when said photographing mode is selected, said photographing condition being changed in accordance with the rotational position of said rotating ring, and wherein said rotating ring operates as a device for selecting one object image from the plurality of object images when the image reproduction mode is selected.

28. The camera of claim 25, further comprising:
- a character memory, in which a plurality of characters is stored, character information, associated with the object image and defined on the basis of the plurality of characters, being set by an operator;
- a character information recorder that selectively reads characters, corresponding to said character information, from the plurality of characters stored in said character memory, and records said character information in said recording medium as additional data; and
- a mode selector for selecting one mode from at least a data-input mode for setting and recording said character information and an image reproduction mode for displaying the object image;
- wherein said rotating ring operates as a device for setting said character information when said data-input mode is selected, said character information to be recorded in said recording medium being set in accordance with the rotational position of said rotating ring, and
- wherein said rotating ring operates as a device for selecting one object image from the plurality of object images when the image reproduction mode is selected.

29. The camera of claim 25, further comprising:
- a character memory, in which a plurality of characters is stored, character information, associated with the object image and defined on the basis of the plurality of characters, being set by an operator;
- a character information recorder that selectively reads characters, corresponding to said character information, from the plurality of characters stored in said character memory, and records said character information in said recording medium as additional data; and
- a mode selector for selecting one mode from at least a photographing mode for recording the object image, a data-input mode for setting and recording said character information and an image reproduction mode for displaying the object image;
- wherein said rotating ring operates as a device for setting a photographing condition when said photographing mode is selected, said photographing condition being changed in accordance with the rotational position of said rotating ring,
- wherein said rotating ring operates as a device for setting said character information when said data-input mode is selected, said character information to be recorded in said recording medium being set in accordance with the rotational position of said rotating ring, and
- wherein said rotating ring operates as a device for selecting one object image from the plurality of object images when the image reproduction mode is selected.

30. A camera body to which a lens barrel with a photographing optical system that forms an object image is detachably mounted, the object image being recorded to a recording medium detachably installed in said camera body, said camera body comprising:
- a character memory, in which a plurality of characters are stored, character information associated with the object image and defined based on the plurality of characters being set by an operator; and
- a character information recorder that selectively reads characters, corresponding to said character information, from the plurality of characters stored in said character memory, and records said character information in said recording medium as additional data,
- wherein said character information recorder reads the characters and records the character information in accordance with a rotational position of a rotating ring provided on an outer surface of the lens barrel, the rotating ring comprising a setter that sets the character information.

31. A lens barrel of a camera detachably mounted to the camera body in claim 30, said lens barrel comprising:
- a photographing optical system that forms an object image, the object image being recorded in a recording medium detachably installed in said camera body, character information associated with the object image being set by an operator and recorded in said recording medium;
- a rotating ring that is rotatably provided on an outer circumference of said lens barrel; and
- a rotational position detector that detects a rotational position of said rotating ring,
- wherein said rotating ring comprises a character setter that sets said character information, said character information to be recorded in said recording medium being set in accordance with the rotational position of said rotating ring.

32. A camera body to which a lens barrel with a photographing optical system that forms an object image is detachably mounted, the object image being recorded to a recording medium detachably installed in said body, said camera body comprising:
- an image reproduction selector that selectively reads one object image from a plurality of object images recorded in said recording medium; and
- an image reproduction displayer that displays the selected object image on a display provided on said camera body,
- wherein said image reproduction displayer selectively displays the selected object image in accordance with the rotational position of a rotating ring that is rotatably provided on an outer circumference of a lens barrel, the rotating ring comprising a selector that selects the object image to be displayed.

33. A lens barrel of a camera detachably mounted to the camera body of claim 32, said lens barrel comprising:
- a rotating ring that is rotatably provided on an outer circumference of said lens barrel; and
- a rotational position detector that detects a rotational position of said rotating ring,
- wherein said rotating ring comprises an object image selector that selects one object image from the plurality of object images, the object image being selected from the plurality of object images in accordance with the rotational position of said rotating ring.

34. A camera having a body and a lens barrel with a photographing optical system, a plurality of object images being recorded in a recording medium detachably installed in said body, said camera comprising:
- a display that displays one object image of the plurality of object images recorded in said recording medium;
- a rotating ring that is rotatably provided on an outer circumference of said lens barrel;
- a rotational position detector that detects a rotational position of said rotating ring,
- wherein the object image displayed on said display is selected from the plurality of object images in accordance with the rotational position of said rotating ring;
- a mode selector that selects one mode from at least a photographing mode for recording the object image and an image reproduction mode for displaying the object image, said rotating ring comprising a setter that sets a photographing condition when said photographing mode is selected, said photographing condition being changed in accordance with the rotational position of said rotating ring, and said rotating ring comprising a selector that selects one object image from the plurality of object images when the image reproduction mode is selected.

* * * * *